United States Patent [19]

Robinson et al.

[11] Patent Number: 4,712,870
[45] Date of Patent: Dec. 15, 1987

[54] FRESNELL LENS AND FILTER FOR USE WITH COMPUTERS AND THE LIKE

[76] Inventors: Donald L. Robinson; William Ojala, both of 660 El Camino, Millbrae, Calif. 94030

[21] Appl. No.: 847,733

[22] Filed: Apr. 3, 1986

[51] Int. Cl.⁴ ............................................. H04N 5/72
[52] U.S. Cl. ...................... 350/243; 350/245; 358/250; 248/286; 248/284; 403/84
[58] Field of Search ............ 248/447.1, 124, 286, 248/284; 358/250, 252, 253; 350/245, 246, 247, 251, 452, 243; 403/84, 91, 395, 97

[56] References Cited

U.S. PATENT DOCUMENTS

| | | | |
|---|---|---|---|
| 1,449,658 | 3/1923 | Deach | 248/286 |
| 1,470,890 | 10/1923 | Stone | 350/251 |
| 2,532,173 | 11/1950 | Lewis | 248/286 |
| 2,590,718 | 3/1952 | Lundquist | 248/124 |
| 2,687,863 | 8/1954 | Vogt | 248/284 |
| 2,706,653 | 4/1955 | Blakely | 248/286 |
| 2,733,035 | 1/1956 | Rocheleau | 248/286 |
| 2,783,015 | 2/1957 | Kampa | 248/291 |
| 3,418,426 | 12/1968 | Schlegel | 350/276 R |
| 4,051,535 | 9/1977 | Inglis | 350/243 |
| 4,253,737 | 3/1981 | Thomsen | 350/276 R |
| 4,309,074 | 1/1982 | Granieri | 350/452 |
| 4,493,535 | 1/1985 | Champeau | 350/452 |
| 4,529,268 | 7/1985 | Brown | 350/276 R |
| 4,547,092 | 10/1985 | Vetter | 403/97 |
| 4,577,928 | 3/1986 | Brown | 350/452 |

Primary Examiner—J. Franklin Foss
Assistant Examiner—Robert A. Olson
Attorney, Agent, or Firm—Julian Caplan

[57] ABSTRACT

A Fresnell lens and filter are disposed in a frame adjustably pivotally attached to a bar extending from a cabinet having a viewing screen for a computer, e.g. The bar is movable to adjust the distance of the lens from the screen and the height of the lens relative to the screen. A clamp for the bar is mounted on the cabinet which, when loosened, permits such adjustment and when tightened fixes the bar in position.

12 Claims, 5 Drawing Figures

FRESNELL LENS AND FILTER FOR USE WITH COMPUTERS AND THE LIKE

BACKGROUND OF THE INVENTION

1. Field of the Invention

This invention relates to a new and improved Fresnell lens and filter for use with computer screens. More particularly, it provides a conveniently adjustable positioning device for a magnifying lens and a filter against harmful rays emanating from a computer screen. The device may be attached to the top of a computer screen cabinet and may be adjusted in position toward and away from the screen and also adjusted so that the filter and lens are interposed perpendicular to the line of sight from the viewer's eye to the screen. Provision is also made for pivoting the screen out of the field of view as required.

2. Background of the Invention

Adjustable lens holders for use with computer visual displays are shown in a number of patents. U.S. Pat. No. 4,529,268 shows a means for adjustment wherein a much more complicated and expensive lens port is required. Lenses and filters for screens are shown in such U.S. Pat. Nos. as 3,418,426 and 4,253,737. The use of a Fresnell lens is also shown in U.S. Pat. No. 4,051,535 and U.S. Pat. No. 4,309,074. An anti-glare panel and assembly for mounting the same on a screen is shown in U.S. Pat. No. 2,427,264. A Fresnell lens with a filter is shown in U.S. Pat. No. 4,493,535. None of the references cited in this paragraph has the flexibility of adjustment which is illustrated herein and described in the following portion of the text of this specification.

SUMMARY OF THE INVENTION

The present invention is intended to solve two problems which occur in the use of computers where the eye of the user is continuously on the screen. One is the relief of eyestrain by enlarging the screen for greater visibility. The other is to screen off from the eyes certain rays which emanate from the screen.

Accordingly, the present invention provides a combination screen and filter in a frame hinged at the end of an elongated rod. The rod is received in a bracket attached to the top of the computer cabinet. A nut, washer and screw engage the rod and permit adjustment of the rod lengthwise to control the distance of the lens from the screen and also to permit adjustment of the position of the rod about the axis of the screw so as to interpose the filter and lens perpendicular to the line of sight from the eye of the viewer to the screen. Provision is also made for pivoting the filter and lens out of the line of sight, if required.

Other objects of the present invention will become apparent upon reading the following specification and referring to the accompanying drawings in which similar characters of reference represent corresponding parts in each of the several views.

DESCRIPTION OF PREFERRED EMBODIMENT

Figure 1:
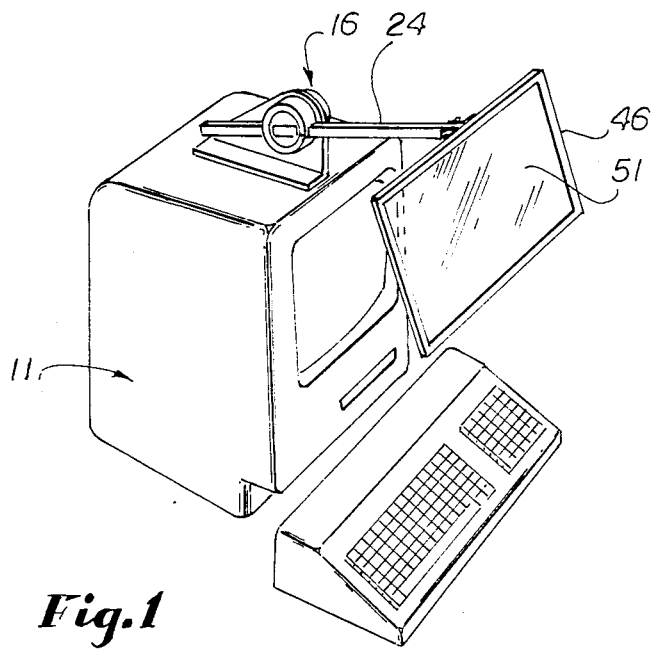
FIG. 1 is a schematic perspective view showing the device mounted on a computer.
Figure 3:
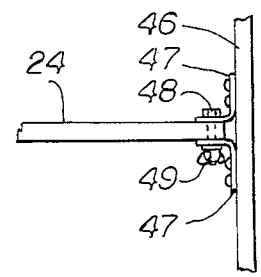
FIG. 3 is a fragmentary top plan view as viewed along the line 3—3 of FIG. 2.
Figure 2:
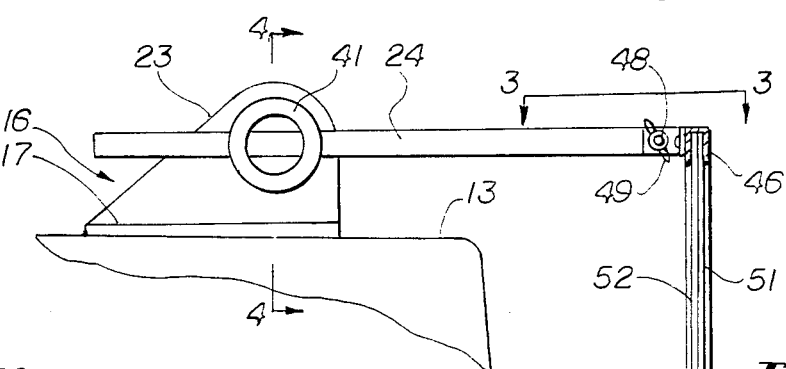
FIG. 2 is an enlarged side elevational view of the device.
Figure 4:
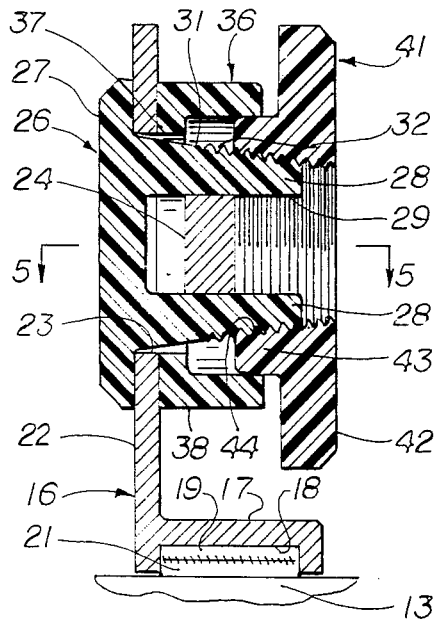
FIG. 4 is a transverse sectional view taken substantially along the line 4—4 of FIG. 2 in enlarged scale.
Figure 5:
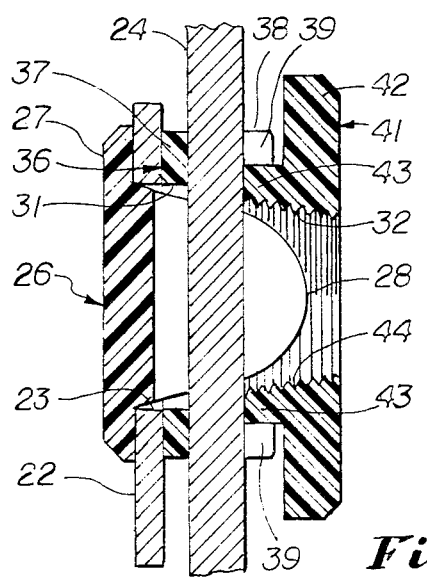
FIG. 5 is a sectional view taken substantially along line 5—5 of FIG. 4.

FIG. 1 shows a computer cabinet 11 having a viewing screen 12 and a top 13. Mounted on top 13 is a bracket 16. A preferred bracket has a base 17 which is formed with a longitudinally extended groove 18 filled with a section of VELCRO material 19. A mating VELCRO strip 21 is mounted by double-face pressure sensitive adhesive to the top 13. Bracket 16 has a vertical member 22 extending out from the base 17 formed with a hole 23. A rectangular cross-section bar 24 is supported by the bracket 16.

Fitting into the hole 23 is a bolt 26 having an enlarged head 27 from which extend two prongs 28 separated by a center groove 29, the width of which is slightly greater than the thickness of bar 24. The exteriors of prongs 28 are formed with a taper and the outer end of the tapered surface is formed with threads 32. The prongs 28 fit through the hole 23 in the vertical member 22.

Washer 36 has a base, the outer side of which fits against the vertical member 22, the prongs 28 extending through the central hole in the base 37. Extending upward from the base 37 is a hollow cylindrical portion 36 which is divided into two parts with openings 39 so that the bar 24 can extend therethrough.

A nut 41 has an enlarged head 42 which may be turned to adjust the device. Extending inward from head 42 is a stem 43 which is tapered complementary to the prongs 28 and fits around the same. The interior of the stem 43 is formed with threads 44 which mate with the threads 32.

When the nut 41 is loosened, the bar 24 is free to move longitudinally relative to the bolt 26 and, further, the bolt 26 may pivot around its axis so that the bar 24 may assume any desired angle relative to the base 17. When the nut 41 is tightened, the tapers 31 and 43 cause the prongs 28 to clamp the bar 24 therebetween. The cylindrical portion 38 of washer 36 prevents the stem 43 from spreading apart and coming out of threaded engagement with the prongs 28. Further, the inner end of the stem 43 engages the outside of the bar 24 and forces the bar against the vertical member 23, thereby preventing the bar from wobbling.

Frame 46, which may be of any size, shape or material of construction, is here shown to be rectangular. Within frame 46 is a Fresnell lens 51 and behind the lens is a filter 52 which screens off from the screen 12 rays which may harm the eyes of the user. It will be understood that the filter material may be deposited on the lens 51 and that the relative positions of the lens and filter may be reversed. Frame 46 is attached to the outer end of rod 24 by means of a pair of L-shaped clips 47 which are attached to the frame by screws or other means. One of the clips 47 is formed with a threaded hole and the other with an enlarged hole. Extending through the hole in one of the clips and a hole in the outer end of rod 24 and threaded into the threaded hole of the other clip is a screw 48, one end of which is provided with a winged head 49. By loosening the screw 48 the frame 46 may be swung from a position interposed in the line of sight between the user and the screen 12 to a different position. Tightening the head 49 of screw 48 clamps the clips 47 against the rod 24 to restrain pivotal movement of the frame 46.

What is claimed is:

1. An auxiliary device for a viewing screen housed in a cabinet, comprising a bracket having a first base and an upward projecting member formed with an aperture, first attachment means adapted to attach said first base to the cabinet, an elongated bar, a Fresnell lens, second attachment means for attaching said lens to an end of said bar, a screw having a second base on one side of said member having a pair of prongs extending through said aperture and beyond the side of said first member opposite said one side, said prongs being separated by a gap slightly wider than the thickness of said bar, the sides of said prongs opposite said gap being formed with a first taper tapering outwardly and formed with first threads and an annular nut having a head and a stem having an internal second taper formed with second threads mating with said first threads, whereby tightening said nut forces said prongs toward each other to clamp said bar therebetween.

2. A device according to claim 1 in which the end of said stem engages said bar to restrain movement of said bar.

3. A device according to claim 1 which further comprises a washer having a base formed with a second aperture on said second mentioned side of said member and a cylindrical projection from said base formed with an opening for said bar, said prongs extending through said second aperture, said stem extending inside said cylindrical projection whereby when said nut is tightened said bar is restrained against rotation relative to said member.

4. A device according to claim 1 in which said first attachment means comprises a VELCRO member attached to said first base and adapted to mate with a second VELCRO member on said cabinet.

5. A device according to claim 4 in which the bottom of said base is grooved out to receive said first mentioned VELCRO member.

6. A device according to claim 1 which further comprises a filter for rays emanating from said screen juxtaposed relative to said lens.

7. A device according to claim 1 in which said second attachment means comprises a frame around said lens and clips attaching said frame to said bar.

8. A device according to claim 7 which further comprises pivot means between said clips and said bar whereby the angle of said lens relative to said bar may be adjusted.

9. A device according to claim 8 which further comprises means for fixing said angle.

10. An adjustable support comprising an elongated bar, a member formed with an aperture, a screw having a base on a first side of said member having a pair of prongs extending through said aperture and beyond a second side of said member opposite said first side, said prongs being separated by a gap slightly wider than the thickness of said bar, the sides of said prongs opposite said gap being formed with a first taper tapering outwardly and formed with first threads and an annular nut having a head and a stem having an internal second taper formed with second threads mating with said first threads, whereby tightening said nut forces said prongs toward each other to clamp said bar therebetween.

11. A support according to claim 10 in which the end of said stem engages said bar to restrain movement of said bar.

12. A support according to claim 10 which further comprises a washer having a base formed with a second aperture on said second side of said member and a cylindrical projection from said base formed with an opening for said bar, said prongs extending through said second aperture, said stem extending inside said cylindrical projections whereby when said nut is tightened said bar is restrained against rotation relative to said member.

* * * * *